US00RE46685E

(19) United States
(12) Reissued Patent
Salonen

(10) Patent Number: US RE46,685 E
(45) **Date of Reissued Patent: *Jan. 23, 2018**

(54) SMS INQUIRY AND INVITATION DISTRIBUTION METHOD AND SYSTEM

(71) Applicant: BOOKIT OY AJANVARAUSPALVELU, Helsinki (FI)

(72) Inventor: Jukka Kalevi Salonen, Luhtijoki (FI)

(73) Assignee: BOOKIT OY AJANVARAUSPALVELU (FI)

( * ) Notice: This patent is subject to a terminal disclaimer.

(21) Appl. No.: 14/519,559

(22) Filed: Oct. 21, 2014

Related U.S. Patent Documents

Reissue of:
(64) Patent No.: 8,849,323
Issued: Sep. 30, 2014
Appl. No.: 13/369,974
Filed: Feb. 9, 2012

U.S. Applications:
(63) Continuation of application No. 12/297,614, filed as application No. PCT/FI2007/502010 on Apr. 20,
(Continued)

(30) Foreign Application Priority Data

Aug. 21, 2001 (FI) ..... 20011680
Apr. 21, 2006 (FI) ..... 20060387

(51) Int. Cl.
*G06Q 10/00* (2012.01)
*G06Q 30/00* (2012.01)
(Continued)

(52) U.S. Cl.
CPC ..... *H04L 12/1868* (2013.01); *H04L 12/189* (2013.01); *H04L 12/1877* (2013.01); *H04W 4/14* (2013.01)

(58) Field of Classification Search
CPC ..... H04L 12/1868; H04L 12/1877; H04L 12/189; H04W 4/14
See application file for complete search history.

(56) References Cited

U.S. PATENT DOCUMENTS 5,592,666 A 1/1997 Perez
5,838,965 A 11/1998 Kavanagh et al.
(Continued)

FOREIGN PATENT DOCUMENTS

CN 1675637 A 9/2005
EP 0881802 A1 2/1998
(Continued)

OTHER PUBLICATIONS

Bmd wireless AG; Wirelss Application Messaging Serivce; Unknown 2004.
(Continued)

*Primary Examiner* — Mary Steelman
(74) *Attorney, Agent, or Firm* — Barnes & Thornburg LLP

(57) ABSTRACT

The invention is an SMS distribution method for inquiries, invitations and proposals in which inquiries are sent to mobile telephone numbers included in a distribution list and their replies are collected as text messages via the SMS service (7) provided by the telecommunications network by means of a software program (1) installed on a server (2). The problem in distributing inquiries with existing SMS services has been the limited possibility of replying to the sending telecommunications operator and separating replies to several inquiries from one another. In the method embodied by this invention, universally reachable mobile network numbers (11) are used as reply addresses for the inquiries, invitations and proposals, and replies are separated from one another by means of reply addresses consisting of public mobile communication network numbers and SMS service numbers and automatically generated reply symbols.

66 Claims, 3 Drawing Sheets

Related U.S. Application Data

Figure 1:
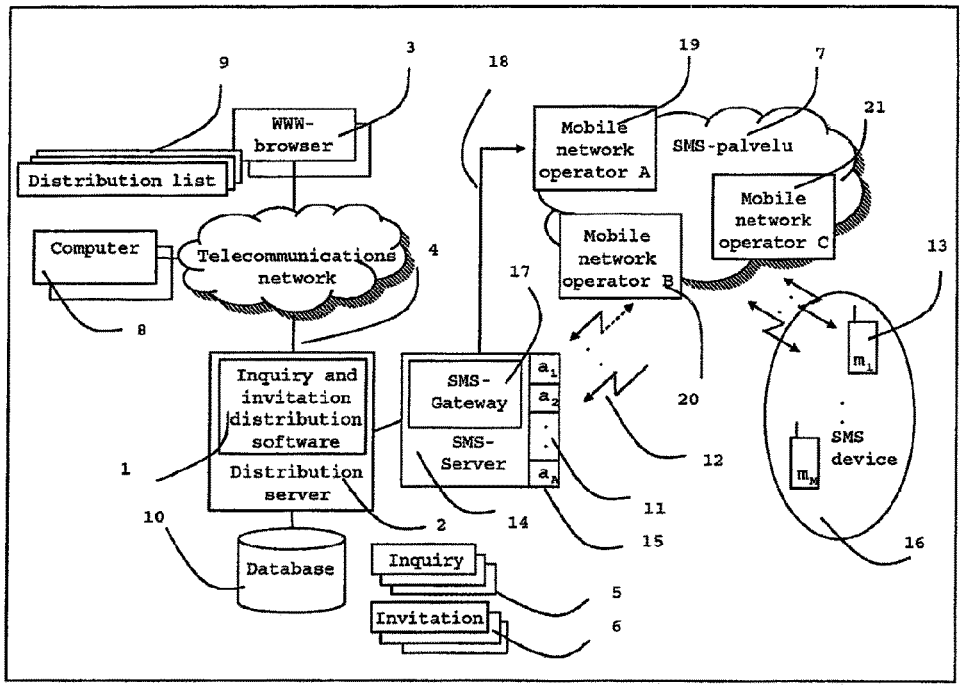

2007, now Pat. No. 8,145,245, which is a continuation-in-part of application No. 10/734,352, filed on Dec. 11, 2003, now Pat. No. 9,313,161, which is a continuation of application No. 10/227,194, filed on Aug. 21, 2002, now Pat. No. 7,406,429.

(51) Int. Cl.

| | |
|---|---|
| ***H04M 11/00*** | (2006.01) |
| ***H04W 4/00*** | (2009.01) |
| ***H04M 3/42*** | (2006.01) |
| ***H04L 12/18*** | (2006.01) |
| ***H04W 4/14*** | (2009.01) |

(56) References Cited

U.S. PATENT DOCUMENTS

| | | | | |
|---|---|---|---|---|
| 5,940,818 | A | 8/1999 | Malloy et al. | |
| 5,987,467 | A | 11/1999 | Ross et al. | |
| 6,003,036 | A | 12/1999 | Martin | |
| 6,085,100 | A | 7/2000 | Teemu | |
| 6,104,870 | A | 8/2000 | Frick et al. | |
| 6,199,076 | B1 | 3/2001 | Logan et al. | |
| 6,236,968 | B1 | 5/2001 | Kanevsky et al. | |
| 6,539,360 | B1 | 3/2003 | Kadaba | |
| 6,560,456 | B1 | 5/2003 | Lohtia et al. | |
| 6,564,261 | B1 | 5/2003 | Gudjonsson et al. | |
| 6,625,461 | B1 | 9/2003 | Bertacchi | |
| 6,639,919 | B2 | 10/2003 | Kroninger et al. | |
| 6,772,336 | B1 | 8/2004 | Dixon, Jr. | |
| 6,873,688 | B1 * | 3/2005 | Aarnio | 379/92.02 |
| 6,990,332 | B2 | 1/2006 | Vihinen | |
| 7,149,537 | B1 | 12/2006 | Kupsh et al. | |
| 7,154,060 | B2 | 12/2006 | Rosenbaum et al. | |
| 7,222,081 | B1 | 5/2007 | Sone | |
| 7,321,920 | B2 * | 1/2008 | Washburn | 709/206 |
| 7,406,429 | B2 | 7/2008 | Salonen | |
| 7,451,118 | B2 | 11/2008 | McMeen et al. | |
| 7,610,208 | B2 | 10/2009 | Salonen | |
| 7,610,224 | B2 | 10/2009 | Spiegel | |
| 7,619,584 | B2 | 11/2009 | Wolf | |
| 7,660,397 | B2 | 2/2010 | Heen et al. | |
| 7,844,674 | B2 | 11/2010 | Madams et al. | |
| 7,996,023 | B2 | 8/2011 | McGary et al. | |
| 8,050,664 | B2 | 11/2011 | Salonen | |
| 8,145,245 | B2 * | 3/2012 | Aula | 455/466 |
| 8,249,920 | B2 * | 8/2012 | Smith | 705/14.1 |
| 8,359,242 | B2 | 1/2013 | Guillot | |
| 8,977,559 | B2 * | 3/2015 | Smith | 705/14.1 |
| 2001/0037264 | A1 | 11/2001 | Husemann et al. | |
| 2001/0049785 | A1 | 12/2001 | Kawan et al. | |
| 2002/0007398 | A1 * | 1/2002 | Mendiola et al. | 709/206 |
| 2002/0028686 | A1 | 3/2002 | Kagi | |
| 2002/0032589 | A1 | 3/2002 | Shah | |
| 2002/0059146 | A1 | 5/2002 | Keech | |
| 2002/0080822 | A1 | 6/2002 | Brown et al. | |
| 2002/0104007 | A1 * | 8/2002 | Moodie et al. | 713/200 |
| 2002/0111914 | A1 | 8/2002 | Terada et al. | |
| 2002/0128908 | A1 * | 9/2002 | Levin et al. | 705/14 |
| 2002/0165000 | A1 | 11/2002 | Fok | |
| 2002/0173319 | A1 * | 11/2002 | Fostick | 455/466 |
| 2002/0174248 | A1 * | 11/2002 | Morriss | 709/238 |
| 2002/0180696 | A1 | 12/2002 | Maritzen et al. | |
| 2002/0184509 | A1 | 12/2002 | Scheidt et al. | |
| 2002/0188562 | A1 | 12/2002 | Igarashi | |
| 2002/0191795 | A1 | 12/2002 | Wills | |
| 2003/0005126 | A1 | 1/2003 | Schwartz et al. | |
| 2003/0101071 | A1 * | 5/2003 | Salonen | 705/1 |
| 2003/0163536 | A1 | 8/2003 | Pettine, Jr. | |
| 2003/0211844 | A1 | 11/2003 | Omori | |
| 2004/0058694 | A1 * | 3/2004 | Mendiola et al. | 455/466 |
| 2004/0097247 | A1 * | 5/2004 | Vilkuna et al. | 455/466 |
| 2004/0128158 | A1 | 7/2004 | Salonen | |
| 2004/0128173 | A1 | 7/2004 | Salonen | |
| 2004/0139318 | A1 | 7/2004 | Fiala et al. | |
| 2004/0157628 | A1 * | 8/2004 | Daniel et al. | 455/466 |
| 2004/0185883 | A1 | 9/2004 | Rukman | |
| 2004/0198322 | A1 | 10/2004 | Mercer | |
| 2005/0027608 | A1 | 2/2005 | Wiesmuller et al. | |
| 2005/0044042 | A1 | 2/2005 | Mendiola et al. | |
| 2005/0054286 | A1 | 3/2005 | Kanjilal | |
| 2005/0065995 | A1 | 3/2005 | Millstein et al. | |
| 2005/0102230 | A1 | 5/2005 | Haidar | |
| 2005/0171738 | A1 | 8/2005 | Kadaba | |
| 2005/0246209 | A1 | 11/2005 | Salonen | |
| 2005/0268107 | A1 | 12/2005 | Harris et al. | |
| 2006/0010085 | A1 | 1/2006 | McMeen et al. | |
| 2006/0040682 | A1 | 2/2006 | Goertz et al. | |
| 2006/0075139 | A1 | 4/2006 | Jungck | |
| 2006/0131385 | A1 | 6/2006 | Kim | |
| 2006/0168064 | A1 | 7/2006 | Huynh et al. | |
| 2006/0224407 | A1 | 10/2006 | Mills | |
| 2006/0271551 | A1 | 11/2006 | Suojasto | |
| 2007/0010266 | A1 | 1/2007 | Chaudhuri | |
| 2007/0047533 | A1 | 3/2007 | Criddle et al. | |
| 2007/0105536 | A1 * | 5/2007 | Tingo, Jr. | 455/414.1 |
| 2007/0123246 | A1 * | 5/2007 | Daniel et al. | 455/422.1 |
| 2007/0135101 | A1 | 6/2007 | Ramati et al. | |
| 2007/0143230 | A1 | 6/2007 | Narainsamy et al. | |
| 2007/0239578 | A1 | 10/2007 | Klemens | |
| 2007/0288215 | A1 | 12/2007 | Goldman | |
| 2008/0147408 | A1 | 6/2008 | Da Palma | |
| 2008/0256191 | A1 * | 10/2008 | Murphy et al. | 709/206 |
| 2008/0285475 | A1 | 11/2008 | Menditto | |
| 2008/0317224 | A1 | 12/2008 | Salonen | |
| 2009/0104925 | A1 * | 4/2009 | Aula | 455/466 |
| 2009/0175422 | A1 | 7/2009 | Marics et al. | |
| 2009/0264100 | A1 | 10/2009 | Sapir et al. | |
| 2009/0281929 | A1 | 11/2009 | Boitet et al. | |
| 2010/0030689 | A1 | 2/2010 | Ramos et al. | |

FOREIGN PATENT DOCUMENTS

| | | | |
|---|---|---|---|
| EP | 0967754 | A2 | 12/1999 |
| EP | 1065899 | A1 | 3/2001 |
| EP | 1458201 | A1 | 9/2004 |
| EP | 1546938 | A1 | 6/2005 |
| FI | 20011680 | A | 2/2003 |
| FI | 000117663 | B | 12/2006 |
| FI | 20060387 | A | 10/2007 |
| FI | 000118586 | B | 12/2007 |
| GB | 2391646 | A | 11/2004 |
| GB | 2435565 | A | 8/2007 |
| KR | 20040013261 | A | 2/2004 |
| WO | 9706603 | A2 | 2/1997 |
| WO | 0041102 | A2 | 7/2000 |
| WO | 0052601 | A1 | 9/2000 |
| WO | 2001013299 | A2 | 2/2001 |
| WO | 0139033 | A1 | 5/2001 |
| WO | 0153991 | A1 | 7/2001 |
| WO | 2002067602 | A1 | 8/2002 |
| WO | 2004019223 | A1 | 3/2004 |
| WO | 2006122399 | A1 | 11/2006 |
| WO | 2007063179 | A1 | 6/2007 |
| WO | 2007122292 | A1 | 11/2007 |
| WO | 2007125171 | A1 | 11/2007 |
| WO | WO 2007122292 | A1 * | 11/2007 |
| WO | 2008017695 | A2 | 2/2008 |
| WO | 2010000949 | A1 | 1/2010 |

OTHER PUBLICATIONS

Content Gateway, Version 4.0; Development and Billing Manual; Jan. 1, 2005, Telia Sonera Finland Oy; www.sonera.fi/files/sonera.fi/.

Elisa Plc's Press Release; BookIT Ltd. and Elisa Implement a Handy Mobile Phone-Enabled Check-In Service for Finnair; Jun. 9, 2004; www.elisa.fi.

Elisa Plc's Press Release; Innovative Solution Receives 2004 European Good Practice Award in Occupational Health and Safety and the appendix BookIT case.pdf; Nov. 22, 2004.

Empower Interactive Group Ltd.; Virtual Mobile Redirector-Product Information Document; Unknown 2001.

(56) References Cited

OTHER PUBLICATIONS

Finnair Plc's Press Release; Finnair to Introduce the World's Easiest Check-In with a Text Message; Jun. 9, 2004; www.bookit.net/news.
Finnish Search Report; May 4, 2006.
Finnish Search Report; Jun. 3, 2009.
Kauppalehti; Mobiilipalvelujen Oltava Yksinkertaisia; BookIT:n Jukka Salonen uskoo tavallisiin tekstiviesteihin; Macropayment Made by Mobile Consumers; Jul. 2002; pp. 1-2; United States.
Mobileway; Mobileway Launches its Mobile Transaction Tracker Solution-An Interactive Platform to Authenticate Macropayment Made by Mobile Consumers; Jul. 2002; pp. 1-2; United States.
Mouly et al.; The GSM System for Mobile Communications; Unknown 1992; pp. 556-560; Palaiseau.
Penttinen; GSM-tekniikka; WSOY; Unknown 1999; pp. 155-157, 222 and 331-332; Porvoo.
Verkkouutiset; Sonera Tarjoaa Matkaviestinoperaattoreille Content Gateway-Palvelualustaa; Feb. 21, 2001; www.verkkouutiset.fi.
Mobileway Launches Its Mobile Transaction Tracker Solution, Press Release from Mobileway Corp., Jul. 11, 2002, San Ramon, CA.

* cited by examiner

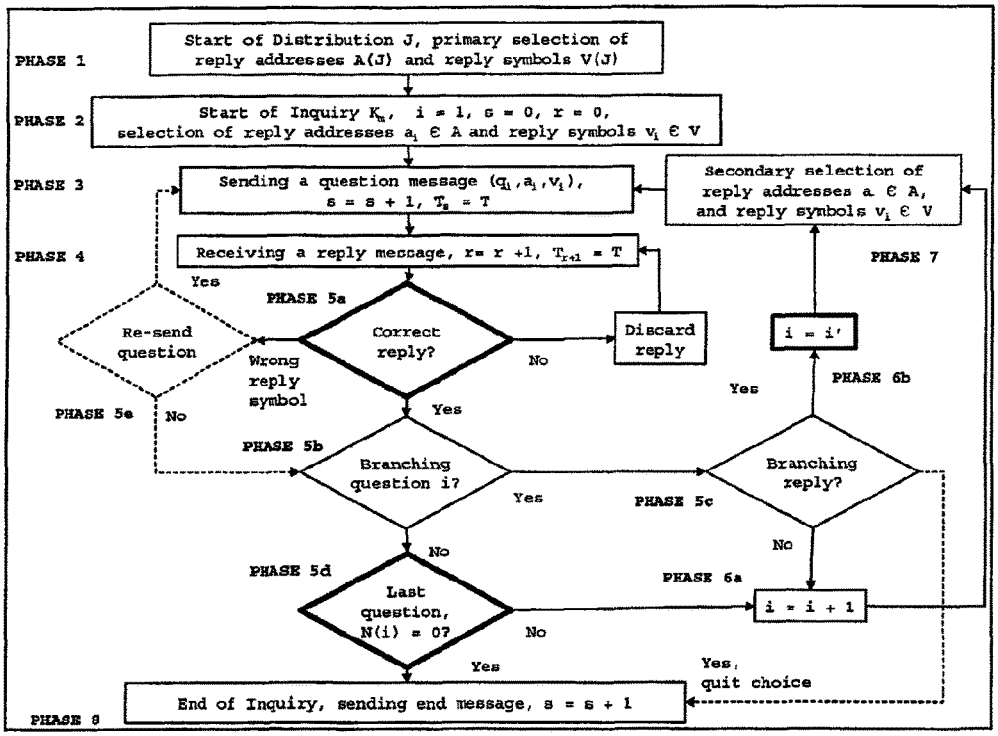

Figure 3

Explanation of symbols in the figure 3:

| | |
|---|---|
| J | = distribution based on the distribution list |
| $K_m$ | = inquiry to a mobile number m |
| i | = number of a question |
| $q_i$ | = question i |
| $a_i$ | = reply address for the question i |
| $v_i$ | = symbols for the reply choices of question i |
| A | = reply addresses for distribution J |
| V | = symbols for the reply choices of the distribution J |
| s | = serial number of the last sent message |
| r | = serial number of the last received message |
| T | = time |
| $T_s$ | = sending time of a message |
| $T_r$ | = receiving time of a message |
| N(i) | = next message after question i |

Figure 4

SMS INQUIRY AND INVITATION DISTRIBUTION METHOD AND SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

[The present application claims priority under 35 U.S.C. §120 to U.S. patent application Ser. No. 12/297,614 filed Oct. 17, 2008, and currently naming Jukka Tapio Aula as a sole inventor, which is the national stage entry of international application No. PCT/FI2007/050210 filed Apr. 20, 2007, which claims priority to Finish Application FI-20060387 filed Apr. 21, 2006. The entire contents of all of the aforementioned applications are herein incorporated by reference.]

*More than one reissue application has been filed for the reissue of U.S. Pat. No. 8,849,323. The reissue applications are Ser. No. 14/519,559 (the present application), Ser. No. 15/095,019, and Ser. No. 15/678,408. Reissue application Ser. No. 15/095,019 (filed Apr. 9, 2016) is a continuation reissue of application Ser. No. 14/519,559. Reissue application Ser. No. 15/678,408 (filed Aug. 16, 2017) is a continuation reissue of application Ser. No. 14/519,559.*

*The present reissue application, U.S. application Ser. No. 14/519,559 is a reissue of U.S. patent application Ser. No. 13/369,974 (which matured into U.S. Pat. No. 8,849,323), which further claims priority to U.S. patent application Ser. No. 12/297,614, filed Oct. 17, 2008, which is the national stage entry of international application No. PCT/FI2007/050210 filed Apr. 20, 2007, which claims priority to Finish Application FI-20060387 filed Apr. 21, 2006.*

*A petition for Delayed Priority claim was filed in U.S. patent application Ser. 13/369,974 and granted; thus. U.S. patent application Ser. No. 13/369,974 is also a continuation in part of U.S. patent application Ser. 10/734,352, which is a continuation of U.S. patent application Ser. No. 10/227,194, filed on Aug. 21, 2002, claims priority under 35 USC 119 and 365(b) to Finnish application No. 20011680, filed in Finland on Aug. 21, 2001. The entire contents of all the aforementioned applications are herein incorporated by reference.*

*Sister Patent*

*Reissue application Ser. No. 13/547,439, having a filing date of Jul. 12, 2012, is a reissue of U.S. patent application Ser. No. 12/297,614, reissued as U.S. Pat. No. Re. 44,073 on Mar. 12, 2013.*

*Child Application*

*U.S. application Ser. No. 14/551,799 (filed Nov. 24th, 2014 and now abandoned) is a continuation of Ser. No. 14/519,559.*

FIELD OF THE INVENTION

This [invitation] *invention* relates to the distribution of inquiries, invitations and proposals by means of an SMS service (Short Message Service) in a telecommunications network. The terms inquiry, invitation and proposal are used interchangeably in the current patent application and also to mean a message or a sequence of messages to which replies are expected in general. Thus, the current patent application is not limited to the SMS distribution of inquiries, invitations and proposals but apply also to requests, queries, questionnaires, surveys, calls, etc.

[Typical to the method is that] *In some embodiments* a) inquiries are sent and replied to and the replies received using the SMS service, b) the same inquiry is distributed to one or more persons, c) the replies of one or more persons are accepted from those replying to the inquiry, d) multiple inquiries can be active simultaneously and activated by separate inquirers, e) the inquirers can activate multiple individual inquiries with multiple individual distributions.

[Typically also the] *In some embodiments* inquiries are sent according to a distribution list, an inquiry is defined a start time when it will be sent and a deadline until which the replies received will be accepted, the distribution will be active from the start time until the deadline or until all questions have been answered, and sent inquiries and questions are active until the deadline or until they have been answered. The start time can have the current time as a default, meaning typically immediate distribution. A question in a particular inquiry typically, but not necessarily, is sent after a reply to the previous question has been received.

Traditional methods for inquiries, such as mail, telephone, e-mail or Internet, are inefficient and ineffective because 1) response rates suffer from the excessive effort involved in replying, 2) responding does not often produce a fast outcome because of the excessive effort involved in handling responses, and 3) useful inquiries are not conducted, because 4) they are expensive and the results uncertain.

Existing inquiry methods based on SMS services include patent proceeding *application* WO02/33991, where *according to which* questions are sent one by one as a text message from an SMS service number ordered from an operator to a replier group selected according to demographic or geographic criteria, and typically the reply address is this same SMS service number in order to allow replying using the "reply to the sender" functionality of the mobile phone without having to type the number.

Existing SMS inquiry methods include the following weaknesses: 1) They are difficult to use in situations where the same replier should reply to several ongoing inquiries, as the inquiries cannot be distinguished from each other without typing identifiers to the reply messages, thus resulting in a lower response rate; 2) Without identifiers within reply messages it is labour intensive to interpret afterwards to which distribution belong the replies to a specific reply address, which makes it difficult to apply distribution-specific pricing and billing, for example according to the size of the distribution or the number of replies received; 3) Replying to the SMS service numbers typically is only possible from the mobile numbers served by those operators from whom the SMS service number in question has been ordered or who has a roaming agreement for SMS service numbers with that operator; 4) Replying to a domestic SMS service number is in general not possible from abroad or from foreign mobile numbers; 5) The SMS service number has to be ordered separately from each operator or from an integrating service provider; 6) If replying to an inquiry is to be made free, a toll-free SMS service number must be used, which involves the problems described above.

The object of the present invention is to [remove the] *alleviate* weaknesses involved in the SMS inquiry methods mentioned above by providing a method whereby a replier can reply to several ongoing inquiries in such a way that typing a single letter, number or symbol found in the mobile device is required in the reply message and at the same time:

1) inquiries and invitations can be distributed in practice to almost all GSM networks and to the mobile numbers of all GSM networks without operator agreements, or alternatively, b) free reply messages to domestic repliers can be provided using toll-free SMS service numbers. An SMS inquiry and invitation distribution method that is easier to use and has more universal reachability compared to traditional methods provides a significant improvement in the effectiveness of inquiry processes.

This objective can be achieved by means of an SMS distribution [method and system] *methods and systems* for inquiries based on the present patent application *disclosure*, which can be implemented using current technology.

By means of the invention a customer organisation utilising the SMS inquiry distribution method can efficiently and effectively carry out customer inquiries and personnel satisfaction surveys, service level measurements, invitations to jobs, emergency calls, and other inquiries, invitations and proposals. [The method is] *Some embodiments are particularly* easy for the replier to use because it requires typing a single character to the reply message at a suitable moment, either at the normal text message price defined by the replier's mobile connection subscription terms, or for free if a toll-free SMS service number is paid for by the customer organisation. The customer organisation can keep track of the replies over the telecommunications network using a WWW browser, by downloading electronic reply reports, and/or by using a communications interface and their own computer system.

[The present invention is] *Some embodiments are* based on the idea that 1) different reply addresses can be set for different distributions of inquiries and inquiries sent to the same mobile number and 2) in formulating inquiries as multiple choice questions (with one to several reply alternatives) reply alternatives can automatically be given different choice symbols based on which replies to different inquiries from the same replier to the same reply address can be separated from one another (matching replies with right questions) and 3) by optionally not sending a new question before a reply to a previous question has been received, successive questions can share the same reply address as the order of replies is set by default. Based on the situation and application, reply addresses or choice symbols to reply alternatives as identifiers can be set for the distribution, the inquiry, and the questions within the inquiry. For example, the method can be used to improve the expected delivery times of reply messages by setting reply addresses according to their expected load. The method can also guarantee the authenticity of replies by making reply addresses represent a reply address series identifying the inquiry and the replier.

In the following the invention is described according to the attached drawings.

Figure 2:
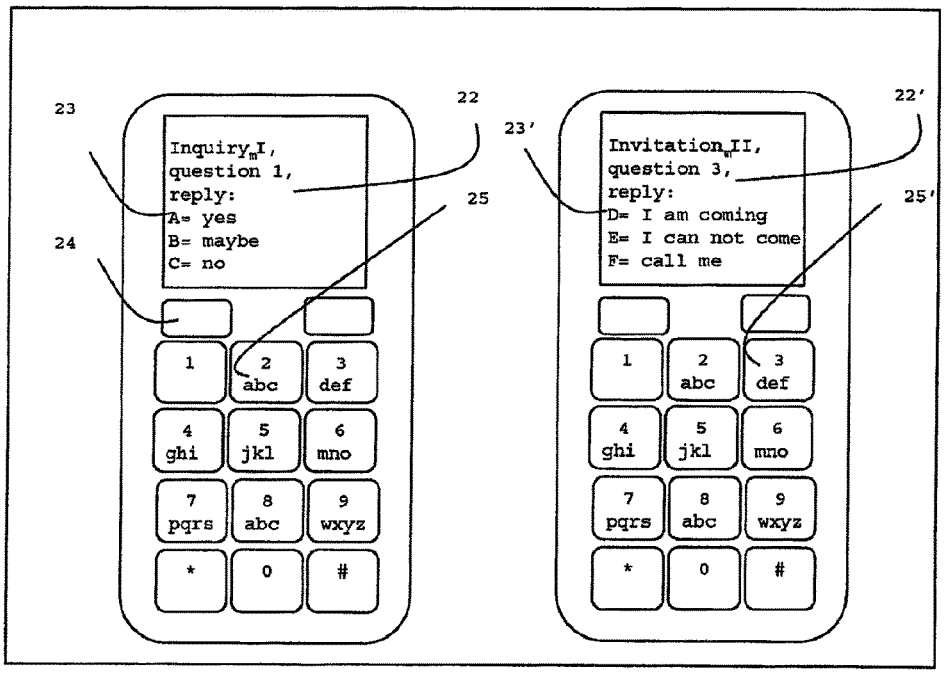

FIG. 1: FIG. 1 shows a diagram of [a preferred] *an exemplary* embodiment of the method FIG. 2: FIG. 2 presents a view of an inquiry based on the method FIG. 3: FIG. 3 shows a distribution flow chart based on the method FIG. 4: FIG. 4 explains the terms of FIG. 3

In FIG. 1 of the [preferred] *an exemplary* embodiment of the method the central logic of the distribution of inquiries is in the Inquiry and Invitation Distribution program (1), hereinafter referred to as Software, which is installed on a Distribution Server (2). A customer designs a new inquiry (5) or invitation (6) in a format suitable for the SMS service (7) using the Software with a WWW browser (3) over a telecommunications network (4) or transfers it to the Software from the customer's system (8), defines a distribution list (9), a sending time and a deadline for the inquiry and activates it. A customer can define the distribution list and edit it with the Software or he/she can transfer it to the Software from the customer's system over the telecommunications network. Inquiries and invitations are saved in the database (10). The Software automatically sets the reply addresses (11) for the distribution among those available, and further from those, according to the situation, the reply addresses (12), i.e. the sender addresses (13) shown in the mobile device, to which the replies will be routed, for the inquiry sent to the mobile devices. In practice the reply addresses are a pool (15) of public mobile communication network numbers and/or SMS service numbers defined in the SMS Server (14).

When SMS service numbers are used as reply addresses, replies will be transferred from the operators providing the SMS service numbers and the mobile connections of the recipients (21) to the SMS Server (14) over the telecommunications network (18).

If enough reply addresses are available, each active distribution can be given its own set of reply addresses, and also separate questions in an inquiry can be given different reply addresses, for example for security or performance reasons. If different reply addresses are not available for each active distribution, different reply addresses can be given for those inquiries and/or their questions that are targeting the same mobile number, or alternatively different reply choice symbols given for distributions, inquiries within distributions and/or separate questions within inquiries correspondingly. The advantages of using different choice symbols instead of different reply addresses are the savings in the number of reply addresses required, and the identification of replies on the mobile device to questions of the same inquiry based on the reply address and choice symbols makes replying and the management of replies easier for the replier. The Software (1) sends the activated distribution to the mobile numbers (16) in the distribution list at the set start time via the SMS Server (14) either a) through the SMS gateway (17) functionality of the SMS Server over an IP connection (18) to the SMS service of the sending telecommunications operator (19), or b) by means of the GSM modems of the SMS Server as SMS messages to the mobile network(s) of the mobile operator(s) (20) providing the modems' mobile connections. The replier answers the questions using the reply to the sender functionality by sending a text message to the reply address via the SMS service of the mobile operator (21) of the mobile device. Replying to an inquiry is easy, because it contains one or more choice questions that can be answered by typing (or by selecting on some devices) only the choice symbol for the chosen reply alternative, typically a letter or a number. The Software saves the replies to a database where they are stored for a defined time. Replies received after the deadline of the distribution are discarded. After a reply has been received from everybody on the distribution list, or after the deadline has been reached, the Software produces a distribution report that can downloaded over the telecommunications network to the customer's computer, read with a WWW browser or like, or printed to a printer. Replies can also be monitored in realtime over the telecommunications network with a WWW browser or like, and they can also be transferred to the customer's system. The Software can be set to perform the distribution to the whole distribution list at once or to send to one mobile number at a time until a set number of replies has been received.

In a significant alternative embodiment of the invention the public mobile communication network numbers are implemented in the SMS service infrastructure of the sending operator (19) instead of a GSM modem pool associated with the SMS Server (14), from where the replies are transferred to the SMS Server (14) over the telecommunications network (18).

This method allows also those kinds of multiple choice questions to which more than one reply alternative can be chosen. In this case the Software matches replies to questions, as with single choice questions, but saves and/or forwards to a customer application a number of choice symbols of the reply message instead of just one. This way additional reply alternatives, for example, can be added to questions as security checks or for authentication purposes.

The selection of using reply addresses vs. choice symbols for matching replies to questions does not have to be in this order, i.e. the selection of choice symbols can precede the selection of reply addresses, and the method does not require the use of reply addresses for matching replies to questions.

FIG. 2 presents the use of choice symbols in the reply alternatives for choice questions in the distributions according to [a preferred] *an exemplary* embodiment of the method. If a mobile number is included in more than one active distribution (22, 22') with a same reply address and/or with unanswered questions having a same reply address at the same time, the distributions have different choice symbols (23,23') in at least for that mobile number in order to match the replies from that mobile number to the right distribution and question. The replier can reply to all questions as easily by using the reply to sender functionality (24) of the mobile device and typing (or selecting with a pointer device on some devices) the choice symbol (25,25') of the chosen reply alternative to the reply message. In the method the reply received can be matched with the right question by means of the symbol acting as a separator without having to interpret the semantic meaning of the reply.

FIG. 3 presents a flow chart of the method. It shows the distribution of an inquiry to a mobile number in the distribution list and receiving replies to sent questions in the inquiry. Each question message can be associated with instructions or other messages that are not presented in the chart with the exception of the end message. The questions in the inquiry form a decision tree structure so that the inquiry branches if a following question to a question is selected based on the choice symbol received in the reply message. In phase 1 the distribution is initialised by defining its reply addresses A(J) from those available and choice symbols V(J) for the reply alternatives of the choice questions from those choice symbols available. In phase 2 the sending of the inquiry to a mobile number in the distribution list is initialised by selecting for the inquiry a reply address a, from available reply addresses A(J), choice symbols $v_i$ from available choice symbols V(J), by initialising the question pointer i and counters s and r for the sent and received messages, respectively. In phase 3 a question message of the inquiry is sent to the mobile number, the sent messages counter s is incremented, and the sending time $T_s$ is saved. In phase 4 a reply to the question sent is received, the received messages counter r incremented and the receiving time $T_r$ is saved into the database. In phase 5 verification checks are made, in phase 5a it is checked whether the reply has been received in the reply address active for the mobile number or not, in phases 5b, 5c and 5d the next question is decided and progressed via phases 6a or 6b to phase 7 or the ending phase 8 of the inquiry, in phase 5e a reply that does not contain an active symbol for the mobile number can be requested again and return to phase 4. In phase 7 a new reply address can be set for the next question, for example for security or performance reasons, or new choice symbols for matching replies. All questions do not necessarily have to be choice questions, and some questions can allow free text as a reply, for example. In this method these kinds of questions will get a distribution-specific reply address.

In the application example 1 of the method a car dealer carries out a customer satisfaction survey and a repair service satisfaction inquiry. The car dealer first transfers a file containing the distribution list to the system implemented according to the method, designs questions for customer satisfaction survey using a WWW browser, sets the start time and the deadline and activates the survey. The car dealer next transfers a file containing the distribution list according to the method, designs questions for the repair service satisfaction inquiry using a WWW browser, sets the start time and deadline and activates the inquiry. The software based on the method automatically defines the reply address for the mobile numbers in the distribution list for the customer satisfaction survey and also the choice symbols. Correspondingly, the software defines the reply address for the mobile numbers in the distribution list for the service satisfaction inquiry and also the choice symbols. If the same mobile numbers are included in the distribution lists, inquiries sent to those are given different reply addresses. If all possible reply addresses for a mobile number are already in use, different inquiry or question-specific choice symbols for the reply alternatives are sent to that mobile number. Separate reply address groups can be defined for repair service satisfaction inquiries and customer satisfaction surveys, which makes the identification of different inquiries easier for the replier and enables pricing variations according to the reply address. Inquiries can also include messages that do not require a reply.

In the application example 2 of the method a hospital carries out a personnel satisfaction survey to certain personnel groups and an emergency alarm in a catastrophe situation to persons off duty. The hospital transfers a file containing a distribution list to the system implemented according to the method, designs the questions and sets the start time and the deadline for the personnel satisfaction survey and activates the survey. The hospital transfers the list of persons off duty in a catastrophe situation to the system according to the method, activates a predefined and automatically updated message sequence for the emergency alarm using a WWW browser or by sending a text message to a number in the system, for example. The software based on the method automatically defines reply addresses and the choice symbols from those available for the mobile numbers in the distribution list of the personnel satisfaction survey. Correspondingly, the software defines the reply addresses and the choice symbols from those available for the mobile numbers in the distribution list for the emergency alarm. If the same mobile numbers are included in both distribution lists, a different reply address from that of the customer satisfaction survey is defined for the emergency alarm sent to those numbers. If all possible reply addresses for the distribution are already in active use, the emergency alarm message sent to the mobile number is given emergency alarm/question-specific choice symbols for the reply alternatives. Separate reply address groups can be defined for customer satisfaction surveys and emergency alarms, which makes the separation of surveys and alarms easier for the replier and enables different pricing. Inquiries and alarms can also include messages that do not require a reply.

In the application example 3 of the method a dentist reminds patients about their annual dental care needs and proposes appointment times. A patient gets an appointment proposal as a text message with time alternatives to choose from by replying with a choice symbol representing the chosen time alternative. If the same patient needs other appointment times as well, for example for children, a different set of choice symbols will be generated for each subsequent unanswered appointment time inquiry for separating the inquiries from one another and enabling the matching of replies to right appointment time proposals.

In the application example 4 of the method a recruitment agency invites candidates to new job assignments. For an assignment the agency sends invitations to a distribution list of potential employees as text messages with reply alternatives, for example "Yes" and "No thanks". According to the method the "Yes" alternative will be attached a choice symbol "A" and "No thanks" alternative a choice symbol "B". At the same time there is another assignment to be filled and the agency sends a corresponding invitation to its distribution list of potential employees. It happens that there are some candidates on both distribution lists. The method automatically generates another set of choice symbols for reply alternatives for a second invitation that is sent to the same mobile number as the first invitation, if the first invitation has not yet been replied to by that person. Thus the "Yes" alternative gets a choice symbol "C" and the "No thanks" alternative gets a choice symbol "D" in the second invitation on those mobile devices that have received the invitation to the first assignment with choice symbols "A" and "B" and who have not yet replied to that invitation. In the receiving end the software automatically matches "C" and "D" replies with the second invitation and "A" and "B" replies with the first invitation.

In the application example 5 of the method a service provider runs an SMS inquiry distribution service using the method for matching replies from mobile numbers with the right applications and customers, such as in the examples 1.4 above, with the right distributions, with the right inquiries/invitations and with the right questions.

The application areas and applications of the present invention and solutions based on the present invention are not limited to those described above. In addition to inquiries, invitations and proposals the invention can be applied, for example, as a process measurement method, in field force task allocation, service delivery inquiries, reminders and cancellations, and permission requests. The method can be implemented, for example, as an SMS distribution service, as an SMS distribution system or as an SMS distribution functionality integrated with other systems.

What is claimed is:

1. A method [for managing a plurality of inquiries to one or more recipients and receiving a plurality of inquiry replies in a network, the method] comprising[: defining,] *performing,* at a server[,] *system having* a plurality of reply addresses available for assignment to each of [the] *a* plurality of inquiries, the reply addresses being [the] addresses [to] *at* which *the server system is configured to receive* replies to the inquiries [are routed;] *the method comprising:* assigning[, at the server,] one of the [defined] *available* reply addresses to an inquiry of the plurality of inquiries;

transmitting the inquiry with the assigned reply address to *a mobile terminal of* at least one recipient, wherein the inquiry includes a choice question containing one or more reply alternatives indicated by corresponding choice symbols and wherein the assigned reply address is indicated as a sender of the inquiry with the assigned reply address; and verifying authenticity of at least one inquiry reply based on *a choice symbol contained in the inquiry reply, wherein for positive verification of authenticity, the choice symbol must be one of the choice symbols corresponding to the reply alternatives contained in the choice question included in the inquiry, and further based on* the replier's mobile number [and choice symbol in the inquiry reply or based on the reply address to which the inquiry reply was routed and the choice symbol in the inquiry reply].

2. The method of claim 1, wherein one or more inquiries are sent to a mobile device with the same reply address.

3. The method of claim 1, wherein the one or more reply alternatives include a letter, a number or another symbol available in a reply functionality of the mobile device.

4. The method of claim 1, further comprising receiving the inquiry reply via the network, wherein the inquiry reply includes a choice symbol selected by the at least one recipient but does not include the choice question included in the inquiry with the assigned reply address.

5. The method of claim 1, wherein each inquiry is sent to one or more recipients per distribution according to a distribution list, and replies to an inquiry are *only* accepted [during] *before* a specified [active time] *deadline*.

6. The method of claim 1, wherein the choice symbols are selected among available choice symbols wherein any mobile number receiving multiple questions with a same reply address will be provided with a unique non-overlapping set of different choice symbols for each separate [active] *unanswered* question.

7. The method of claim 1, wherein the inquiries are transmitted to the one or more recipients via Short Messaging Service messages.

8. The method of claim 1, wherein inquiries include more than one separate questions to which the recipient may reply to in corresponding inquiry replies.

9. The method of claim 1, further comprising identifying content of a next inquiry for transmission to the at least one recipient based on the choice symbol included in the inquiry reply from the at least one recipient.

10. The method of claim 1, further comprising, if no inquiry reply is received with a defined time frame or the inquiry reply includes a choice symbol that was not indicative of one of the reply alternatives, retransmitting the inquiry with the assigned reply address to the at least one recipient.

11. The method of claim 1, further comprising saving inquiry replies into a database accessible via a web browser or for transfer to a computer system of a customer via a network connection.

12. The method of claim 1, further comprising defining separate reply addresses groups for different type of inquiries and applying a pricing variation according to the reply address selected for the [an] inquiry.

13. The method of claim 1, wherein the at least one inquiry is a text message.

14. The method of claim 13, wherein the inquiry reply is also a text message.

15. The method of claim 1, wherein the at least one inquiry is a Short Message Service message.

16. The method of claim 15, wherein the inquiry reply is also a Short Message Service message.

17. The method of claim 1, wherein the inquiry reply is a text message.

18. The method of claim 1, wherein the inquiry reply is a Short Message Service message.

19. The method of claim 1, wherein the transmitted inquiry is transmitted to a recipient's mobile device having a corresponding mobile number and the verification of the authenticity of the at least one inquiry reply is based on the replier's mobile number and choice symbol in the inquiry reply received from the recipient's mobile device.

20. The method of claim 1, wherein the verification of the authenticity of the at least one inquiry reply is also based on the reply address to which replies to the at least one inquiry are routed.

21. A *server* system [for managing a plurality of inquiries to one or more recipients and receiving a plurality of inquiry replies in a network, the system] comprising:

at least one server [that defines] *having* a plurality of reply addresses available for assignment to each of [the] *a* plurality of inquiries, the reply addresses being [the] addresses [to which replies to the inquiries are routed, the at least one server assigning one of the defined reply addresses to an inquiry of the plurality of inquiries], *at which the server system is configured to receive replies to the inquiries;* wherein the [at least one] server *system* is coupled to at least one communication network and transmits the inquiry with the assigned reply address to at least one recipient via the at least one communication network, wherein the inquiry includes a choice question containing one or more reply alternatives indicated by corresponding choice symbols and wherein the assigned reply address is indicated as a sender of the inquiry with the assigned reply address, wherein the [at least one] server [also] *system* verifies authenticity of at least one inquiry reply [received via the at least one communication network based on the replier's mobile number and choice symbol in the inquiry reply or based on the reply address to which the inquiry reply was routed and the choice symbol in the inquiry reply], *wherein for positive verification of authenticity, the choice symbol must be one of the choice symbols corresponding to the reply alternatives contained in the choice question included in the inquiry, and based on the replier's mobile number.*

22. The system of claim 21, wherein one or more inquiries are sent to a mobile device with the same reply address.

23. The system of claim 21, wherein the one or more reply alternatives include a letter, a number or another symbol available in a reply functionality of the mobile device.

24. The system of claim 21, wherein the at least one server receives the inquiry reply via the network, wherein the inquiry reply includes a choice symbol selected by the at least one recipient but does not include the choice question included in the inquiry with the assigned reply address.

25. The system of claim 21, wherein each inquiry is sent to one or more recipients per distribution according to a distribution list, and replies to an inquiry are *only* accepted [during] *before* a specified [active time] *deadline*.

26. The system of claim 21, wherein the choice symbols are selected among available choice symbols wherein any mobile number receiving multiple questions with a same reply address will be provided with a unique non-overlapping set of different choice symbols for each separate [active] *unanswered* question.

27. The system of claim 21, wherein the inquiries are transmitted to the one or more recipients via Short Messaging Service messages.

28. The system of claim 21, wherein inquiries include more than one separate questions to which the recipient may reply to in corresponding inquiry replies.

29. The system of claim 21, wherein the at least one server identifies content of a next inquiry for transmission to the at least one recipient based on the choice symbol included in the inquiry reply from the at least one recipient.

30. The system of claim 21, if no inquiry reply is received with a defined time frame or the inquiry reply includes a choice symbol that was not indicative of one of the reply alternatives, the at least one server retransmits the inquiry with the assigned reply address to the at least one recipient.

31. The system of claim 21, further comprising a database in which the at least one server saves inquiry replies, wherein the database is accessible via a web browser or for transfer to a computer system of a customer via a connection to the at least one communication network.

32. The system of claim 21, further comprising defining separate reply addresses groups for different type of inquiries and applying a pricing variation according to the reply address selected for the [an] inquiry.

33. The system of claim 21, wherein the at least one inquiry is a text message.

34. The method of claim 33, wherein the inquiry reply is also a text message.

35. The system of claim 21, wherein the at least one inquiry is a Short Message Service message.

36. The method of claim 35, wherein the inquiry reply is also a Short Message Service message.

37. The system of claim 21, wherein the inquiry reply is a text message.

38. The system of claim 21, wherein the inquiry reply is a Short Message Service message.

39. The system of claim 21, wherein the at least one server transmits the inquiry to a recipient's mobile device having a corresponding mobile number and the verification of the authenticity of the at least one inquiry reply is based on the replier's mobile number and choice symbol in the inquiry reply received from the recipient's mobile device.

40. The system of claim 21, wherein the verification of the authenticity of the at least one inquiry reply is also based on the reply address to which replies to the at least one inquiry are routed.

41. A method for managing a plurality of inquiries to one or more recipients and receiving a plurality of inquiry replies in a network, the method comprising:

defining, at a server, a plurality of reply addresses available for assignment to each of the plurality of inquiries, the reply addresses being the addresses to which replies to the inquiries are routed;

assigning, at the server, one of the defined reply addresses to an inquiry of the plurality of inquiries;

transmitting the inquiry with the assigned reply address to at least one recipient, wherein the inquiry includes a choice question containing one or more reply alternatives indicated by corresponding choice symbols and wherein the assigned reply address is indicated as a sender of the inquiry with the assigned reply address; and verifying authenticity of at least one inquiry reply [based on the replier's mobile number and the reply address to which the inquiry reply was routed], *wherein for positive verification of authenticity, the choice symbol must be one of the choice symbols corresponding to the reply alternatives contained in the choice question included in the inquiry, and based on the reply address at which the server system received the inquiry reply.*

42. The method of claim 41, wherein one or more inquiries are sent to a mobile device with the same reply address.

43. The method of claim 41, wherein the one or more reply alternatives include a letter, a number or another symbol available in a reply functionality of the mobile device.

44. The method of claim 41, wherein the inquiries are transmitted to the one or more recipients via Short Messaging Service messages.

45. The method of claim 41, wherein the at least one inquiry is a text message.

46. The method of claim 41, wherein the at least one inquiry is a Short Message Service message.

47. The method of claim 41, wherein the inquiry reply is a text message.

48. The method of claim 41, wherein the inquiry reply is a Short Message Service message.

49. The method of claim 41, wherein the transmitted inquiry is transmitted to a recipient's mobile device having a corresponding mobile number and the verification of the authenticity of the at least one inquiry reply is based on the replier's mobile number and the reply address to which the inquiry reply was routed.

50. A system for managing a plurality of inquiries to one or more recipients and receiving a plurality of inquiry replies in a network, the system comprising:

at least one server that defines a plurality of reply addresses available for assignment to each of the plurality of inquiries, the reply addresses being the addresses to which replies to the inquiries are routed, the at least one server assigning one of the defined reply addresses to an inquiry of the plurality of inquiries, wherein the at least one server is coupled to at least one communication network and transmits the inquiry with the assigned reply address to at least one recipient via the at least one communication network, wherein the inquiry includes a choice question containing one or more reply alternatives indicated by corresponding choice symbols and wherein the assigned reply address is indicated as a sender of the inquiry with the assigned reply address, and wherein the at least one server also verifies authenticity of at least one inquiry reply received via the at least one communication network [based on the replier's mobile number and the reply address to which the inquiry reply was routed], *wherein for positive verification of authenticity, the choice symbol must be one of the choice symbols corresponding to the reply alternatives contained in the choice question included in the inquiry, and based on the reply address at which the server system received the inquiry reply.*

51. The system of claim 50, wherein one or more inquiries are sent to a mobile device with the same reply address.

52. The system of claim 50, wherein the one or more reply alternatives include a letter, a number or another symbol available in a reply functionality of the mobile device.

53. The system of claim 50, wherein the inquiries are transmitted to the one or more recipients via Short Messaging Service messages.

54. The system of claim 50, wherein the at least one inquiry is a text message.

55. The system of claim 50, wherein the at least one inquiry is a Short Message Service message.

56. The system of claim 50, wherein the inquiry reply is a text message.

57. The system of claim 50, wherein the inquiry reply is a Short Message Service message.

58. The system of claim 50, wherein the transmitted inquiry is transmitted to a recipient's mobile device having a corresponding mobile number and the verification of the authenticity of the at least one inquiry reply is based on the replier's mobile number and the reply address to which the inquiry reply was routed.

*59. The method of claim 1, wherein the inquiry transmission comprises transmitting the inquiry in a format which results in the assigned reply address being shown as sender address in a display of the mobile terminal of the at least one recipient.*

*60. The method of claim 1, wherein the inquiry reply only comprises one character.*

*61. The system of claim 21, wherein the inquiry transmission comprises transmitting the inquiry in a format which results in the assigned reply address being shown as sender address in a display of the mobile terminal of the at least one recipient.*

*62. The system of claim 21, wherein the inquiry reply only comprises one character.*

*63. The method of claim 41, wherein the inquiry transmission comprises transmitting the inquiry in a format which results in the assigned reply address being shown as sender address in a display of the mobile terminal of the at least one recipient.*

*64. The method of claim 41, wherein the inquiry reply only comprises one character.*

*65. The system of claim 50, wherein the inquiry transmission comprises transmitting the inquiry in a format which results in the assigned reply address being shown as sender address in a display of the mobile terminal of the at least one recipient.*

*66. The system of claim 50, wherein the inquiry reply only comprises one character.*

* * * * *